Patented July 7, 1936

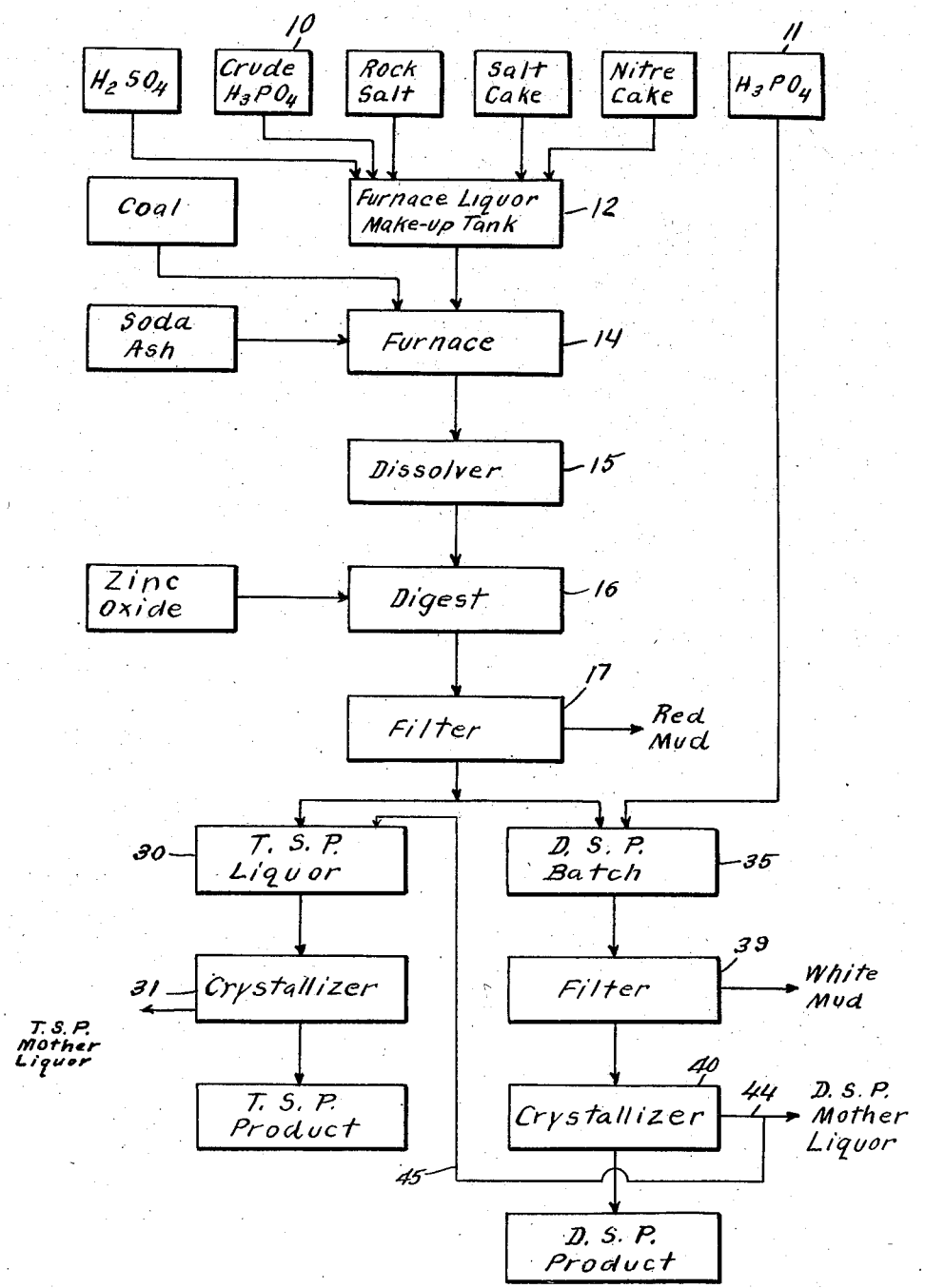

2,046,829

UNITED STATES PATENT OFFICE 2,046,829

MANUFACTURE OF PHOSPHATES

Charles L. Levermore, Rockville Centre, N. Y., assignor to General Chemical Company, New York, N. Y., a corporation of New York Application June 30, 1933, Serial No. 678,324

9 Claims. (Cl. 23—106)

This invention relates to the manufacture of alkali metal phosphates, and more particularly to processes for producing di- and/or trialkali metal phosphates. Although directed to the production of alkali metal phosphates generally, for convenience, the process constituting the invention will be described in connection with the making of sodium phosphates.

Alkali phosphates have heretofore been produced by methods such as those described in U. S. Patents Nos. 744,128, November 17, 1903, and 1,037,837, September 3, 1912, to Strickler. In the process of the former patent, phosphate containing material, such as phosphate rock (calcium phosphate), is digested in a water solution of nitre cake (NaHSO4). According to Patent 1,037,837, phosphate rock may be digested with sulfuric acid, and, after the removal of the precipitated calcium sulfate, salt cake (Na2SO4) is added to the phosphoric acid solution. In the processes of both patents, the solutions of crude phosphoric acid and sodium salts of sulfuric acid thus obtained are furnaced with carbonaceous material to produce trisodium phosphate.

The Lohmann U. S. Patent No. 1,727,551, September 10, 1929, describes a modified procedure, relating to the Strickler processes, according to which procedure by utilization of a preferred ratio of sodium sulfate to phosphoric acid in the furnace mix, a furnaced material having desirable physical properties, and a higher yield and degree of purity of phosphate products are obtained. Further improvements involving principles of the Strickler patents are set forth in Levermore U. S. Patent No. 1,866,657, July 12, 1932. The Levermore patent describes digestion of phosphate rock in sulfuric acid, and separation of precipitated calcium sulfate. The crude phosphoric acid solution is then neutralized to produce sodium phosphate liquor and a precipitate known in the art and referred to herein as "white mud". On separation of liquor and white mud, the latter may be incorporated as a constituent of a mix furnaced with carbonaceous material by the process of the Strickler patents.

In the operation of the Strickler and Lohmann processes, whether in accordance with these patents alone or when performed in conjunction with the process of the Levermore patent, the furnace product obtained is a crude trisodium phosphate containing a predominating proportion of trisodium phosphate, a lesser quantity of disodium phosphate as pyrophosphate, and insoluble matter containing P2O5 and sodium values as a relatively complex compound. In the prior production of commercial trisodium phosphate from the crude trisodium phosphate furnace product, the latter, after dissolving in water or mother liquor, is treated with caustic soda to convert the pyrophosphate to trisodium phosphate, to recover P2O5 and sodium values from the insoluble matter, and to adjust the alkalinity of the mother liquor to the trisodium phosphate point. This operation involves the use of expensive caustic soda.

The present invention provides a method whereby in the manufacture of commercial di- and/or trisodium phosphate from crude trisodium phosphate, the use of caustic soda is avoided.

One feature of the invention lies in the provision of a method for converting disodium phosphate to trisodium phosphate. The invention especially includes a method for producing trisodium phosphate by means of a reaction involving disodium phosphate and sodium carbonate. It has been found that by heating an alkali metal carbonate such as sodium carbonate, with an acid phosphate such as disodium phosphate, conversion of disodium phosphate to trisodium phosphate may be readily effected. This discovery, though of general application relative to the production of tribasic alkali metal phosphates from dibasic alkali metal phosphates, is of particular commercial value in conjunction with the manufacture of disodium phosphate and trisodium phosphate from crude trisodium phosphate produced by the furnace process. Hence, for convenience, the invention will be described primarily in connection with the production of sodium phosphates by furnacing.

When practicing the invention in connection with the production of crude trisodium phosphate by the furnace process, a mix desirably of sodium sulfate and phosphoric acid is furnaced with carbonaceous material, and preferably when the furnacing operation is substantially complete, soda ash is added to the batch of crude furnace product, and the high temperatures of the furnacing operation maintained for an appreciable period of time to effect reaction between the sodium carbonate and constituents of the furnace product. The crude product is then dissolved in water or trisodium phosphate mother liquor, and filtered, the filtrate comprising a substantially pure trisodium phosphate liquor which may be concentrated and crystallized to produce commercial trisodium phosphate, or may be cut back with phosphoric acid to produce disodium phosphate.

One embodiment of the process of the invention will be first described when utilizing raw materials, and may be more readily understood from a consideration of the following description taken in connection with the accompanying drawing showing a flow sheet of the process.

The furnace liquor mix formed in tank 12 may be made up as described in the Strickler, Lohmann and Levermore patents of raw materials such as salt cake, nitre cake, or rock salt used separately or in any combination, together with crude phosphoric acid and sulfuric acid, for example, a batch of 30-32° Bé. furnace liquor contains about 8-9% $H_3PO_4$, about 2-3% $H_2SO_4$ and about 17-18% $Na_2SO_4$. The mix thus formed has a $Na_2SO_4$—$P_2O_5$ ratio of about 2.8:1. The quantity of sulfuric acid employed is preferably such as to provide in the resulting mix an acidity equivalent to about 2-3% free sulfuric acid to insure volatilization of HF and $SiF_4$ and consequent removal of these compounds from the mix in the subsequent furnacing operation.

In making up a furnace liquor, a preferred ratio of $Na_2SO_4$ to $P_2O_5$, substantially within the limits of 2.75 to 2.85 of $Na_2SO_4$ to 1 of $P_2O_5$, is maintained as in the Lohmann patent. In other terms, the proportion of $Na_2SO_4$ should preferably be approximately 92 to 95% of that theoretically required to produce trisodium phosphate. If the ratio of liquor in tank 12 is outside the limits noted, the ratio may be adjusted as needed by adding proper quantities of phosphoric acid or sodium salts. If sodium bisulfate is used, in forming the mix, the acid of the bisulfate is taken into account when providing for the above noted excess of sulfuric acid.

About 260-270 parts of the 30-32° Bé. furnace liquor are concentrated in a preliminary evaporator until nearly saturated with respect to sodium sulfate, e. g. about 40° Bé. The concentrated furnace liquor is furnaced with carbonaceous material such as coal, in a rotary furnace by direct heating with hot combustion gases, as described in the Strickler and particularly in the Lohmann patent. In furnacing a liquor such as above noted 5-6 parts of coal may be used. The crude trisodium phosphate product then in the furnace may contain in the present example, about 70% trisodium phosphate, 20% disodium phosphate in the form of pyrophosphate, 2-3% $Na_2SO_4$, and 5-10% insoluble matter, and correspond to about 40 parts. In this furnace product and in the furnace products of prior methods approximately 10% of the total $P_2O_5$ and sodium input to the furnace are contained in this insoluble matter as a complex compound.

By the present process, prior operating disadvantages involving production of pyrophosphate in the furnace charge and inclusion of sodium and $P_2O_5$ values in the insoluble matter are overcome by introduction of sodium carbonate into the furnace. Sodium carbonate is added to the furnace preferably in amounts sufficient to convert pyrophosphate to trisodium phosphate, to provide free caustic to release sodium and $P_2O_5$ values contained in the insoluble matter, and to provide an excess of caustic in the dissolved furnace product of about 2% to facilitate subsequent crystallization of trisodium phosphate. Generally, the soda ash added to the furnace is about 10-11% of the sodium finally included in the product. Of this amount of sodium carbonate, about 75% is consumed in converting disodium phosphate (pyrophosphate) to trisodium phosphate, the remainder being utilized to provide free caustic in amount necessary to release sodium and $P_2O_5$ values contained in the insoluble matter, and to provide about 2% excess of caustic in the crystallization stage.

When following preferred procedure in the present invention, and after the usual furnacing operation has been carried out, the sodium carbonate, which may be in a dampened condition, is charged into the furnace 14, and the high temperatures prevailing during the furnacing operation, e. g. 1250-1850° F., are continued for about an hour. In the present example about 4-5 parts of soda ash may be added, about 75% being utilized to convert pyrophosphate to orthophosphate, the remaining 25% being employed in unlocking phosphate and soda values from insolubles and producing about 2% free caustic in the furnace product.

The furnace product as introduced into dissolver 15 is a solid crude trisodium phosphate containing, for example, approximately 5% insoluble material comprising "red mud" constituents, 2% $Na_2O$, 0.5% $Na_2CO_3$, 2-3% $Na_2SO_4$, the balance comprising probably all trisodium phosphate although some of the phosphate may be present as pyrophosphate. The furnace product may be dissolved in water or trisodium phosphate mother liquor, and the mass is preferably boiled which hastens conversion of any pyrophosphate to orthophosphate and aids in separating $P_2O_5$ and soda values from the red mud material. It is believed that the furnace product contains little, if any, pyrophosphate. If the latter is present in the furnace product, the pyrophosphate appears to be substantially immediately converted to the ortho form on introduction of the furnace product into the dissolver.

From the dissolver the liquor flows into digest tank 16 in which the liquor may be treated with zinc oxide or zinc in quantities sufficient to effect precipitation as zinc sulfide of soluble sulfides contained in the liquor. The latter is run into filter 17 in which the so-called red mud, comprising principally iron and aluminum oxides, coal ash and zinc sulfide is separated from the liquor and discharged to waste.

When proceeding in accordance with the process of the present invention, by adding to the crude trisodium phosphate product in the furnace soda ash in amounts about equivalent to the caustic formerly employed in the steps of the process subsequent to the dissolver and heating the crude trisodium phosphate and soda ash as described, a furnace product may be obtained which, after dissolving and boiling in the dissolver, can be filtered once in filter 17 to remove the red mud. Whether the conversion of the pyrophosphate to trisodium phosphate and the release from the complex salt of the locked in sodium and $P_2O_5$ values takes place in the furnace 14, or in the subsequent dissolving of the mass, or in both, is not definitely known. However, indications are that the reaction involved takes place in the furnace. Hence, the filtrate of filter 17 is a liquor substantially all trisodium phosphate, and containing about a 2% excess of free caustic which facilitates crystallization of trisodium phosphate.

In treating the furnaced product with sodium carbonate, according to the invention it has been found that part of the sodium carbonate goes to provide free caustic soda, or at least to a form which will decompose insoluble matter to release therefrom sodium and P₂O₅ values.

When it is desired to use all or part of the filtrate of filter 17 for the manufacture of trisodium phosphate, the liquor is pumped into trisodium phosphate batch tank 30, preferably concentrated, and then run to trisodium phosphate crystallizer 31, from which trisodium phosphate crystals are sent to storage.

To make disodium phosphate from all or a portion of the liquor from filter 17, the filtrate is run into disodium phosphate batch tank 35, and treated therein with phosphoric acid from 11. The amount of acid added is such as to cut the trisodium phosphate back to the disodium point. On adding acid, a relatively small amount of the so-called "white mud" precipitate containing sodium fluosilicate and phosphates of calcium, iron and aluminum is formed, and may be separated from the disodium phosphate liquor in filter 39, the white mud being refurnaced, to save sodium and P₂O₅ values. The disodium phosphate filtrate from filter 39 is introduced into a disodium phosphate crystallizer 40, the crystal product thereof being recovered and sent to storage.

Sodium and P₂O₅ values of the disodium phosphate mother liquor may be recovered by mixing any desired portions of the disodium phosphate mother liquor withdrawn through line 44 with trisodium phosphate liquor from filter 17. In connection with this method of recovering such values from disodium phosphate mother liquor, i. e., by admixture with trisodium phosphate liquor from filter 17, the present invention offers particular advantages. By increasing the quantity of soda ash fed into the furnace, it is possible to produce a filtered trisodium phosphate furnace liquor (filtrate of filter 17) containing a considerable amount of caustic soda, say for example 4-5%, such liquor thus having a sodium to phosphate ratio much greater than three to one. Consequently, with a liquor of this nature it is possible to add, as through line 45, enough disodium phosphate liquor or disodium phosphate mother liquor to the filtered furnace liquor in tank 30 to reduce the sodium to phosphate ratio to about three to one to produce trisodium phosphate.

When carrying out the furnace process, for example, in the manufacture of di- or trisodium phosphate as desired, there are produced substantial quantities of trisodium phosphate mother liquors, and also the so-called white mud. These substances contain sodium and P₂O₅ values which, when operating on a commercial scale, must be saved. To recover such values, a furnace mix may be made up, of trisodium phosphate mother liquor, white mud, sulfuric acid, crude phosphoric acid, salt cake, nitre cake and rock salt. Hence formation of furnace mixes, and treating the furnaced products of such mixes with sodium carbonate is included in the invention. A digest liquor made up of such materials is furnaced with coal, and after the furnacing operation, soda ash is added and reacted with the furnace product substantially as already described above. However, when so operating the much higher insoluble content due to the white mud causes a 40-60% pyrophosphate content which, in the present example, would require about 15 parts of soda ash to effect conversion to orthophosphate, unlock phosphate and soda values in the insolubles and provide about 2% free caustic.

The process of the invention is particularly adaptable for effecting recovery of sodium and P₂O₅ values from disodium phosphate mother liquors such as those withdrawn from line 44 or disodium phosphate mother liquors resulting from the process of the above mentioned Levermore patent.

Disodium phosphate mother liquor may be run into a batch tank such as tank 12 and employed in making up a furnace mix. Disodium phosphate mother liquors are relatively pure, containing for example about 2% sodium sulfate and no substantial quantities of other impurities. Because of the absence from the disodium phosphate mother liquor of impurities such as fluorine, the alkaline disodium phosphate mother liquor may be employed directly in making up a batch of furnace liquor without treating the disodium phosphate mother liquor with sulfuric acid.

When refurnacing disodium phosphate mother liquor, the furnace liquor may be formed by adding sodium carbonate or sodium sulfate to the disodium phosphate mother liquor. When using sodium carbonate, the mix is made up by adding to the liquor sodium carbonate in quantities sufficient to provide therein approximately reacting proportions of sodium phosphate and sodium carbonate. The resulting liquor may be concentrated, if desired, and furnaced without coal. By furnacing the mother liquor with normal sodium carbonate the trisodium phosphate may be produced, and at the same time the impurities in the mother liquor, such as sodium sulfate, may be decomposed and a crude anhydrous product low in sulfate and containing substantially all trisodium phosphate may be obtained.

When forming the furnace batch with disodium phosphate mother liquor and salt cake, the latter is added to the mother liquor in a batch tank until the above mentioned preferred Na₂SO₄—P₂O₅ ratio is obtained. Trisodium phosphate mother liquor may also be included in the mix. This liquor may be concentrated and furnaced with coal as in the Strickler and Lohmann patents. When furnacing is substantially completed, sodium carbonate may be added to the crude trisodium phosphate product, and the heating of the crude furnace product and sodium carbonate continued as above described in connection with the furnacing of a phosphoric acid-sodium sulfate liquor.

When operating with disodium phosphate mother liquor batches of this nature, since impurities such as fluorine and silica are not included in the batch, acid need not be present during furnacing. It is not preferred to use nitre cake or sodium chloride in conjunction with making up a batch of furnace liquor from disodium phosphate mother liquor, since the acid of the nitre cake would be wasted serving no useful purpose in furnacing, and sulfuric acid would be required to convert the sodium chloride to sodium sulfate if sodium chloride were employed.

When furnacing a batch of disodium phosphate mother liquor and sodium sulfate, it is preferred to add the sodium carbonate to the resulting crude trisodium phosphate product after furnacing of the disodium phosphate mother liquor-sodium sulfate liquor with coal. The crude product made by furnacing the liquor comprising disodium phosphate mother liquor as a substantial constituent, because of the absence of any substantial amounts of impurities in the constituents of the batch, contains a smaller amount of insoluble matter than is obtained when working with an acid liquor as previously described. Hence, relatively smaller amounts of soda may be added to and heated with the crude trisodium phosphate product. Thus when furnacing a liquor comprising principally disodium phosphate mother liquor and salt cake, the amount of soda ash added to the crude trisodium phosphate product is preferably such as to convert the pyrophosphate to trisodium phosphate, and also to provide an excess of about 2% free caustic to facilitate subsequent crystallization of trisodium phosphate. Should the furnace product contain a small amount of insoluble matter, sufficient soda ash should be used to recover sodium and $P_2O_5$ values held in the insoluble matter.

The liquor from the furnace product dissolver may be utilized for manufacture of di- and/or trisodium phosphate as above described. This phase of the process of the invention may be employed to advantage where it is desired to produce relatively large amounts of disodium phosphate.

In the above operations, heating of sodium carbonate with the furnace product, at temperatures usually prevailing during the furnacing operation per se, e. g. 1250–1850° F., it is believed two principal reactions take place. The first is apparently a reaction between the disodium phosphate in the furnace product and the sodium carbonate producing trisodium phosphate. Research has indicated that by heating theoretical quantities of disodium phosphate and sodium carbonate at temperatures around 1560° F., anhydrous trisodium phosphate is formed. The second important occurrence is believed to be the release of sodium and $P_2O_5$ values held in a complex compound in the crude trisodium phosphate furnace product and conversion of these values to trisodium phosphate.

The principles of the invention involving reaction of sodium carbonate and disodium phosphate may be applied otherwise than described above. These materials may be reacted as solutions or in an anhydrous condition, and at normal or elevated pressures. When the materials are in the anhydrous condition, a sufficiently high temperature may be utilized to effect the fusion. When superatmospheric pressures are employed, it may be desirable to remove the gas liberated during the reaction by means of an inert gas stream. In the case of aqueous solutions, where it is desired to maintain a considerable quantity of water present, steam may be used to advantage for this purpose.

When it is desired to obtain the product of the reaction of sodium carbonate and disodium phosphate as a solution, the dibasic phosphate may be treated as a solution with the alkali metal carbonate. To promote the reaction, high temperatures are preferred, since the reaction proceeds considerably more rapidly. The solution may, for example, be treated with the alkali metal carbonate in an autoclave or other closed vessel at a temperature and pressure substantially above atmospheric. In such cases, steam may be passed through the vapor space of the autoclave in order to carry away carbon dioxide liberated during the reaction.

The following are illustrative examples or reactions involving sodium carbonate and sodium phosphate carried out under pressure in accordance with the invention.

*Example 1.*—8 parts of sodium carbonate were heated with 270 parts of an aqueous 26.5% disodium phosphate solution in an autoclave at 185 pounds per square inch pressure and 385° F. for a period of four hours. During the heating a current of steam was passed through the autoclave to drive off carbon dioxide evolved in the reaction without effecting a substantial evaporation of the solution. Under these conditions the conversion of the disodium phosphate and the sodium carbonate to trisodium phosphate took place substantially completely. The following table shows the degree of completion of the reaction for various periods:

|  | Duration of reaction | | | |
| --- | --- | --- | --- | --- |
|  | 1 hr. | 2 hrs. | 3 hrs. | 4 hrs. |
| Percentage of $Na_2HPO_4$ converted | 20.3 | 25.9 | 26.9 | 27.8 |
| Percentage of $Na_2CO_3$ converted | 67.7 | 86.3 | 89.7 | 92.7 |

In Example 1 above, 30% of the amount of sodium carbonate theoretically required for the complete conversion of disodium phosphate to trisodium phosphate was employed. With not less than about 6 mols of disodium phosphate for each mol of sodium carbonate the reaction proceeds satisfactorily under the above conditions of temperature and pressure. If desired, the autoclaved solution may be treated with sodium hydroxide to effect the conversion of the remaining disodium phosphate to trisodium phosphate.

With increased proportions of sodium carbonate the yield over the same period of time may be increased in regard to the percentage of disodium phosphate converted to trisodium phosphate but a smaller percentage of the sodium carbonate enters into the reaction. The following example will illustrate this tendency of the reaction when 40% of the theoretical amount of sodium carbonate is employed.

*Example 2.*—10.7 parts of sodium carbonate were heated with 270 parts of an aqueous 26.5% disodium phosphate solution in an autoclave at 185 pounds per square inch pressure and 385° F. for a period of four hours. During the reaction steam was passed through the autoclave in the same manner as in Example 2 above. Under these conditions the reaction took place as follows:

|  | Duration of reaction | | | |
| --- | --- | --- | --- | --- |
|  | 1 hr. | 2 hrs. | 3 hrs. | 4 hrs. |
| Percentage of $Na_2HPO_4$ converted | 25.3 | 32.5 | 33.9 | 34.1 |
| Percentage of $Na_2CO_3$ converted | 63.3 | 81.3 | 84.8 | 85.3 |

In order to obtain a product that is low in sodium carbonate under the above conditions of temperature and pressure, it is consequently preferred to employ the sodium carbonate in a quantity sufficient to react with not more than about 30% of the sodium acid phosphate. In this manner a conversion of more than 90% of the entire quantity of sodium carbonate to the phosphate is obtainable and the product is not contaminated with large quantities of the unreacted carbonate.

Under milder conditions of treatment than those set forth in the above example,—that is, under lower temperatures and correspondingly lower pressures, the synthesis also takes place in a similar manner but to a lesser degree than under the conditions set forth in the examples. In general, the conversion is increased when the solution is autoclaved at increased temperatures and pressures.

The trisodium phosphate may be separated from unreacted disodium phosphate by fractional crystallization, but ordinarily it is preferable to convert the remainder of the disodium phosphate to trisodium phosphate by an addition of sodium hydroxide and then recover the product by crystallization.

The expressions "dibasic phosphate" and "disodium phosphate" as used in the claims are intended to include not only the acid salts themselves but also those salts which are hydrolyzable to the dibasic phosphate. For example, $Na_4P_2O_7$ may be readily hydrolyzed to $Na_2HPO_4$ in acid or alkaline solution in accordance with the equation:

$$Na_4P_2O_7 + H_2O \rightarrow 2Na_2HPO_4$$

In general the dibasic phosphate during furnacing is converted to the sodium pyrophosphate so that for the purpose of the furnacing with sodium carbonate the two compounds may be regarded as equivalents.

By lower alkali metal phosphate as used in the claims is meant a phosphate having a lower molecular ratio of alkali metal to phosphate than 3:1.

I claim:

1. The method of preparing trisodium phosphate which comprises heating a solution of disodium phosphate with sodium carbonate under superatmospheric pressure such as to maintain the reaction mixture in liquid condition.

2. The method of making trialkali metal phosphate which comprises heating a solution of a dialkali metal phosphate with a carbonate of the alkali metal at temperature above about 1360° F. under superatmospheric pressure such as to maintain the reaction mixture in liquid condition.

3. The method of preparing a trialkali metal phosphate from a lower alkali metal phosphate, which comprises heating, at an elevated temperature and under superatmospheric pressure, a solution of a lower alkali metal phosphate with an alkali metal carbonate in sufficient quantity to obtain in the reaction mixture a molecular ratio of alkali metal to phosphate of at least about three to one.

4. The method of preparing trialkali metal phosphate from a solution containing dialkali metal phosphate, which comprises heating said solution with alkali metal carbonate under superatmospheric pressure, while passing inert gas therethrough to remove carbon dioxide liberated by the decomposition of said alkali metal carbonate.

5. The method for producing alkali metal phosphate which comprises forming a furnace mix comprising alkali metal sulphate material and phosphate radical containing material, introducing the mix into a reaction zone, furnacing the materials with carbonaceous material at elevated temperatures to produce an initial furnace product comprising trialkali metal phosphate predominately, and smaller amounts of dialkali metal phosphate and insoluble material containing alkali metal and phosphate, then introducing into the furnace alkali metal carbonate in quantity at least sufficient to convert dialkali metal phosphate to trialkali metal phosphate and to release alkali metal and phosphate contained in the insoluble material, and then continuing furnacing and maintaining the elevated furnacing temperatures for a substantial period of time to produce a final crude alkali metal phosphate furnace product having an alkali metal to phosphate ratio of at least about three to one.

6. The method for producing alkali metal phosphate which comprises forming a furnace mix comprising alkali metal sulphate material and phosphate radical containing material, introducing the mix into a reaction zone, furnacing the materials with carbonaceous material at elevated temperatures to produce an initial furnace product comprising trialkali metal phosphate predominately, and smaller amounts of lower alkali metal phosphate, and insoluble material containing alkali metal and phosphate, then introducing into the furnace alkali metal carbonate in quantity at least sufficient to convert lower alkali metal phosphate to trialkali metal phosphate and to release alkali metal and phosphate contained in the insoluble material and to obtain an ultimate furnace product having an alkali metal to phosphate ratio greater than three to one, and then continuing furnacing and maintaining the elevated furnacing temperatures for a substantial period of time to produce such ultimate alkali metal phosphate furnace product.

7. The method for producing alkali metal phosphate which comprises forming a furnace mix comprising alkali metal sulphate material and phosphoric acid containing material, introducing the mix into a reaction zone, furnacing the materials with carbonaceous material at elevated temperatures to produce an initial furnace product comprising trialkali metal phosphate predominately, and smaller amounts of lower alkali metal phosphate and insoluble material containing alkali metal and phosphate, then introducing into the furnace alkali metal carbonate in quantity at least sufficient to convert lower alkali metal phosphate to trialkali metal phosphate and to release alkali metal and phosphate contained in the insoluble material, and then continuing furnacing and maintaining the elevated furnacing temperatures for a substantial period of time to produce a final crude alkali metal phosphate furnace product having an alkali metal to phosphate ratio of at least about three to one.

8. The method for producing alkali metal phosphate which comprises forming a furnace mix comprising alkali metal sulphate material and dialkali metal phosphate mother liquor containing material, introducing the mix into a reaction zone, furnacing the materials with carbonaceous material at elevated temperatures to produce an initial furnace product comprising trialkali metal phosphate predominately, and smaller amounts of lower alkali metal phosphate and insoluble material containing alkali metal and phosphate, then introducing into the furnace alkali metal carbonate in quantity at least sufficient to convert lower alkali metal phosphate to trialkali metal phosphate and to release alkali metal and phosphate contained in the insoluble material, and then continuing furnacing and maintaining the elevated furnacing temperatures for a substantial period of time to produce a final crude alkali metal phosphate furnace product having an alkali metal to phosphate ratio of at least about three to one.

9. The method for producing alkali metal phosphate, which comprises forming a furnace mix comprising alkali metal sulphate material and phosphoric acid containing material, introducing the mix into a reaction zone, furnacing the materials with carbonaceous material at elevated temperatures to produce an initial furnace product comprising trialkali metal phosphate predominately, and smaller amounts of dialkali metal phosphate and insoluble material containing alkali metal and phosphate, then introducing into the furnace alkali metal carbonate in quantity at least sufficient to convert dialkali metal phosphate to trialkali metal phosphate, to release alkali metal and phosphate contained in the insoluble material and to obtain an ultimate furnace product having an alkali metal to phosphate ratio greater than three to one, and then continuing furnacing and maintaining the elevated furnacing temperatures for a substantial period of time to produce such ultimate alkali metal phosphate furnace product.

CHARLES L. LEVERMORE.